H. BROUSSEAU.
WELDING TORCH.
APPLICATION FILED JUNE 12, 1909.
992,156.
Patented May 16, 1911.
2 SHEETS—SHEET 1.
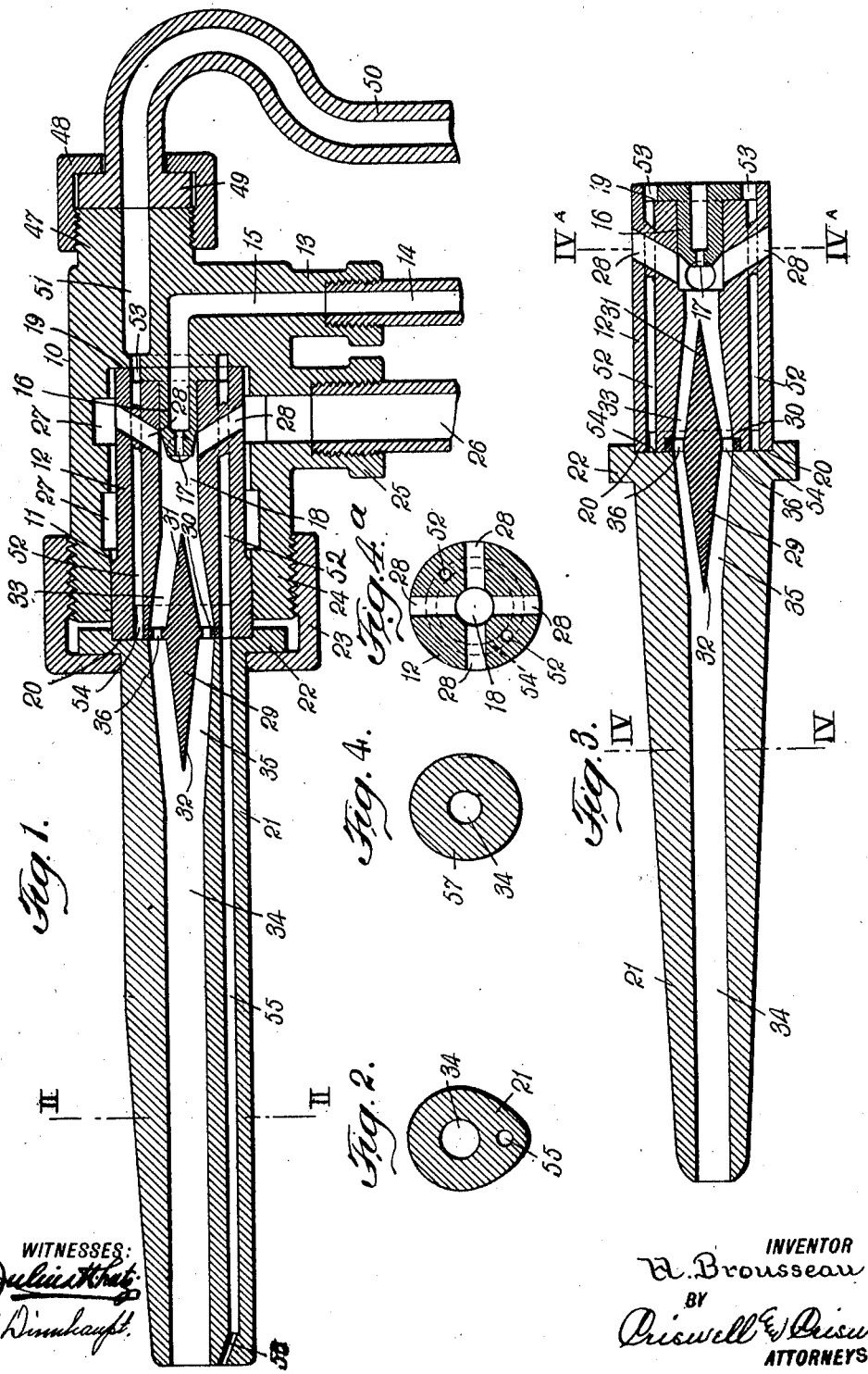
WITNESSES:
INVENTOR
H. Brousseau
BY
Criswell & Criswell
ATTORNEYS

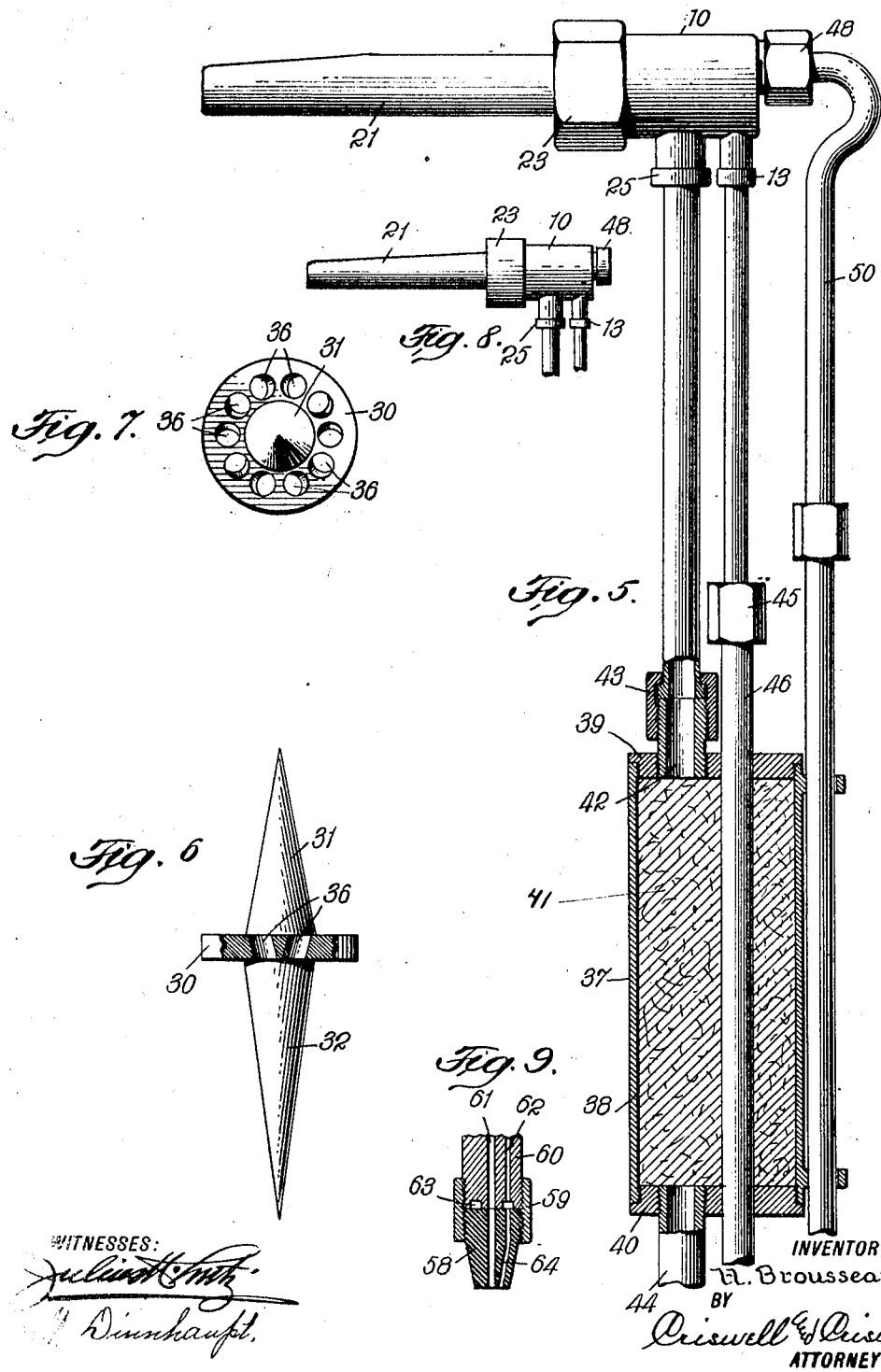

UNITED STATES PATENT OFFICE.

HARRY BROUSSEAU, OF NEW YORK, N. Y., ASSIGNOR OF ONE-HALF TO MARCUS STERN, OF NEW YORK, N. Y.

WELDING-TORCH.

992,156.  Specification of Letters Patent.  Patented May 16, 1911.

Application filed June 12, 1909. Serial No. 501,865.

*To all whom it may concern:*

Be it known that I, HARRY BROUSSEAU, a citizen of the United States, and a resident of New York, county and State of New York, have invented certain new and useful Improvements in Welding-Torches, of which the following is a full, clear, and exact description.

This invention relates more particularly to a welding torch which is adapted also to cut metal.

The primary object of the invention is to provide a simple and efficient device in which the gas producing the heat flame may be properly and thoroughly mixed and thereby make the device more effective than is the case with such devices as ordinarily constructed.

Other objects of the invention are to provide simple and efficient means whereby the device is adapted for cutting purposes, and to provide simple means whereby the cutting part of the device may be shifted to avoid the necessity for moving the tool about the work.

A further object of the invention is to provide a simple and efficient device for preventing the flame under any condition from passing backward into the source of supply of the gas or gases.

A still further object of the invention is to provide a device which may be readily made and assembled.

With these and other objects in view, the invention will be hereinafter more particularly described with reference to the accompanying drawings, which form a part of this specification, and will then be pointed out in the claims at the end of the description.
In the drawings, Figure 1 is a longitudinal section of one form of device embodying my invention. Fig. 2 is a transverse section taken on the line II—II of Fig. 1. Fig. 3 is a longitudinal section of a tool adapted simply for welding purposes, only part of the same being shown. Fig. 4 is a transverse section taken on the line IV—IV of Fig. 3. Fig. 4ª is a transverse section taken on the line IVª—IVª of Fig. 3. Fig. 5 is a side elevation, partly in section, showing the means for handling the device. Fig. 6 is an elevation, partly broken away, of the gas mixing device or element. Fig. 7 is a plan view of the gas mixing device. Fig. 8 is an elevation of a tool shown for welding purposes only; and Fig. 9 is a detail view of the lower end of the device showing how a separable tip may be applied thereto.

The device, Figs. 1, 2, 5 and 6, has a head 10, and this head is provided with a chamber 11 in which is held a cylindrical member or part 12. The head 10 is provided at one side thereof with an extending part 13, and connected with this part is a pipe or connection 14 through which oxygen or other gas is adapted to pass. The part 13 is provided with a passage way 15 which communicates with the pipe 14, and within the member 12 is a tubular part or nipple 16 having a reduced opening 17 which communicates with the angular passage 15, and said nipple opens into a chamber or passageway 18 in the member 12. This member 12 has one end fitting against a shoulder 19 of the head or casing 10, and its other end fitting into a recess as 20 in the nozzle or tip 21, and said nozzle 21 has a shoulder 22 which is adapted to be engaged by a nut 23, the threaded portion of which engages the threaded end 24 of the casing or head 10 so that said nozzle 21, head 10, and member 12 may be rigidly clamped and held together in such a way as to form a gas seal between the same, though in case it is desired to turn or rotate the nozzle 21 for any purpose, this can be readily done by releasing the nut 23 to simply rotate the nozzle 21, or the nut permits the removal of the nozzle if so desired.

The casing or head 10 is provided with a tubular extension 25 adjacent to the extension 13, and attached to this extension is a pipe 26 to which acetylene or other gas may be caused to pass. The casing 10 has its chamber 11 somewhat enlarged, as at 27, so as to communicate with a plurality of inclined or downwardly-extending openings 28 which communicate with the source of acetylene gas supply 26 and with the mixing chamber or passage-way 18 within the member 12, so that the acetylene gas may be properly supplied to the passage 18 and thus meet the oxygen gas passing through the opening 17 of the nozzle 16 from the passageway 15. The oxygen gas under pressure meets the acetylene gas as it passes from the nipple 16 and the pressure of the oxygen gas being greater than that of the acetylene, the action will be somewhat the same as an injector and the two gases will move together but not properly mixed through the chamber 18.

A mixing device 29 is located between the nozzle 21 and the member 12. This device has a disk-like flange or base 30 which is interposed between the member 12 and the nozzle 21, and projecting outward on one side of the flange 30 is a conical projection 31, and on the opposite side and in alinement therewith, is a conical projection 32, the latter being somewhat longer than the projection 31. The chamber 18 of the member 12 is flared, as at 33, at one end to form an annular space about the projection 31, while the nozzle 21 has an opening or passage 34 therethrough which is flared, as at 35, to provide an annular space about the projection 32. The flange 30 is provided with a number of openings 36 in the flange 30 around the projections 31 and 32, and these openings are arranged in pairs and each pair is inclined toward each other so that as the gas passes through said openings they will be caused to intersect each other in the form of jets. The oxygen gas from the connection 14 in passing through the nozzle 16 will meet the acetylene gas from the pipe 26 and both gases under pressure will pass to the mixing device 29, and by reason of the openings and particularly the inclination of the alternating openings will cause a better mixture of the gas and therefore a more effective heat generated thereby when lighted. The flared part 35 is in alinement with the flared part 33 of the chamber 18 and forms a continuation thereof, and the area of the flared parts 33 and 35 and the openings 36 as compared to that of the passage 34 and smaller end of the chamber 18 is such that the gases will pass freely and thereby avoid any back pressure whatever, the area of the flared part being larger and the flow of the gas as it leaves the nozzle being the same as when it enters the chamber 18.

The gas, either oxygen or acetylene, may be forced into the casing 11 and controlled in any desired way. As shown the pipe 26 leads to the handle portion 27, and this handle portion comprises a cylindrical casing 38 the ends of which are closed by the caps 39 and 40, and within the casing is arranged mineral wool or asbestos 41. A nipple 42 projects outward from the head 39, and on the nipple is a nut 43 which is adapted to engage the end 44 of the pipe 26 so as to hold the same detachably to the nipple 42, and leading to the casing is a supply pipe 44 which is held to the end of the head 40 so that the acetylene gas may be forced within the handle under any desired pressure and may be caused to pass through a non-combustible material as asbestos or mineral wool 41 to the pipe 26, the purpose of the asbestos being to prevent a flame from passing backward from the torch to the source of gas supply or to burn the hand of the operator. The pipe 14 for oxygen has a coupling nut 45 for securing the same to a pipe 46 which extends through the handle 37 and may be held in any desired way in the casing heads, the said pipes being provided with valves or other means to control the supply of gas.

When the device is adapted for cutting metal, I provide the casing or head 10 with a threaded extension 47 to which is held a nut 48, and this nut engages the flange 49 of a pipe 50 leading to a source of oxygen supply. The pipe 50 may be of any desired length and may be made to pass through the handle 37 or be supported thereon, as by lugs, so that said pipe may be readily disconnected at will. The pressure of the gas through the pipe 50 is much greater than that through the pipe 25 or the pipe 26, and is utilized with the welding flame. For example, if the pressure of the acetylene gas is from one to five pounds, leading from the pipe 26 the pressure of the oxygen gas through the pipe 25 may be twenty-five pounds, and that through the pipe 50 may be fifty pounds or any desired pressure, the effect being to secure a very high degree of heat by the burning of the gases after they leave the nozzle 21. The casing 10 has a passage 51 communicating with the pipe 50, and this passage communicates with one of two channels 52 of the member 12, and at the upper and lower ends of the member 12 are annular chambers or grooves 53 and 54 respectively, which connect the two channels 52 together. The second channel 52 communicates with a channel or passage 55 of the nozzle 21, and at the lower end said passage is angularly formed, as at 56, and somewhat reduced, and is intended to direct the oxygen gas from the passage 55 into the gas escaping through the passage 34 and to unite therewith as the latter is burning. By providing the annular groove or chamber 54, it will be seen that the nozzle 21 may be rotated or be moved to different positions and the passage 55 will always communicate with the passage 52, so that it will be unnecessary for the tool to be moved around as is usually required in cutting, as the nozzle itself can be readily shifted by releasing the nut 23 to permit the nozzle to be rotated.

In Figs. 3, 4, 4ᵃ and 8, the device is constructed simply for welding and not for welding and cutting metal as in the other form. Here the nozzle, as 57, is substantially the same as the nozzle 21 except that the passage 55 is dispensed with, and said nozzle is connected to the member 12, and between the member 12 and nozzle 57 is the mixing device 29 substantially the same as shown in the other figures. The casing 10 is shown removed in Fig. 3, and in Fig. 8 the pipe 50 for the oxygen gas under the highest pressure is removed, though it may be attached to the casing and a different nozzle applied thereto if desired.

In Fig. 9 the nozzle is provided with a carbon tip or end piece 58, and this tip may be held by a nut 59 to the end of the nozzle 60. The nozzle 60 is provided with a passage 61 extending therethrough and used simply for welding purposes and when used for cutting purposes, the said nozzle is provided with a passage-way 62 which communicates with an annular chamber 63 in the end of the nozzle, and leading from the chamber through the nozzle tip is a passage-way 64 for cutting purposes.

From the foregoing it will be seen that a simple and efficient means is provided whereby oxygen and acetylene gases may be thoroughly mixed within the torch, thereby producing a more effective heat; that said device is simple in construction and may be readily made and assembled; that a simple device is provided for thoroughly mixing the gases; that said device is adapted for either welding or cutting purposes; that simple means is provided whereby the gases may be positively controlled; and that said gas mixing device while arranged in the path of movement of the gas is so constructed that the gas may pass by the same freely without any back pressure resulting from the use of said device.

Having thus described my invention, I claim as new and desire to secure by Letters Patent:—

1. A torch, comprising a head having a chamber, a nozzle held to the head, a mixing device having parts projecting into the head and the nozzle, and means for supplying different gases to the chamber and said device.

2. A device of the character described, comprising a head having a chamber, means for supplying different kinds of gas to said head, and a device having a part projecting into said chamber and having openings dividing the same into a series of intersecting jets to thoroughly mix the same.

3. A torch of the character described, comprising a head, means for supplying different kinds of gas to said head, and a device having forwardly-extending openings arranged in parts and angularly disposed with relation to each other for giving a mixing action to the gases.

4. A device of the character described, comprising a head having a chamber therein, means for supplying different kinds of gas to said chamber under pressure, and a device entering said chamber and dividing the gases into a series of intersecting jets to thoroughly mix the same.

5. A device of the character described, comprising a head having a mixing chamber, means for supplying two different kinds of gas to said chamber to mingle therein, and a device having parts projecting into the chamber and having angularly disposed openings to divide the gas and to cause the same to intersect in jets to thoroughly mix the same.

6. A device of the character described, comprising a head having a source of supply for oxygen and acetylene gas, a cylindrical member held within the head and having a chamber therein and inclined openings communicating with the source of acetylene gas supply, said chamber also communicating with the source of oxygen supply, a nozzle detachably held to the head, and a mixing device interposed between the cylindrical member and the nozzle.

7. A device of the character described, comprising a head having a source of supply for oxygen and acetylene gas, a cylindrical member held within the head and having a chamber therein and inclined openings communicating with the source of acetylene gas, said chamber also communicating with the source of oxygen supply, a nozzle held to the head, means whereby the nozzle may be rotated, and a mixing device interposed between the cylindrical member and the nozzle and dividing the gas into a series of intersecting jets.

8. A device of the character described, comprising a casing having a chamber, a nozzle, independent means for supplying different gases to the chamber, and a mixing device comprising a disk having conical projecting parts on opposite sides thereof and with openings arranged in pairs and inclined toward each other and communicating with said chamber and with the nozzle.

9. A device of the character described, comprising a casing having an inner chamber, independent means for supplying different gases to the chamber, and a mixing device comprising a disk-like part and parts projecting on opposite sides thereof, and with openings arranged in pairs in the disk-like part and inclined toward each other and communicating with said chamber.

10. A device of the character described, comprising a head, independent means for supplying different gases to the head, and a mixing device having projecting parts, and openings arranged to divide the gas and cause the divided gas to intersect in its passage through the head.

11. In a torch of the character described, a mixing device comprising a perforated part having parts projecting therefrom, and with openings arranged in pairs and inclined toward each other.

12. In a device of the character described, the combination with a head having a cylindrical chamber therein, of a cylindrical member held within the chamber and having a gas passage therethrough, one end of said passage being flared and forming a chamber, a part projecting inward within the chamber of the member from the head, a source of oxygen gas supply for the projecting part, a source of acetylene gas supply, said cylindrical member having inclined openings communicating with the source of acetylene gas supply and located adjacent to the projecting part of the head, a nozzle having a passage therethrough and having an enlarged end, a nut detachably holding the nozzle to the head and to the inner member, and a mixing device interposed between the inner cylindrical member and the nozzle.

13. In a device of the character described, the combination with a head having a chamber therein, of a member held within the chamber and having a gas passage therethrough, one end of such passage being flared, a part projecting inward within the passage of the member from the head, a source of oxygen gas supply for the projecting part, a source of acetylene gas supply, said member having inclined openings communicating with the source of acetylene gas supply and located adjacent to the projecting part of the head, a nozzle having a passage therethrough, means for rotatably holding the nozzle to the head, and a mixing device interposed between the inner member and the nozzle.

14. In a device of the character described, a head having independent sources of gas supply, and a mixing device arranged in the path of the gases and comprising a base having a plurality of openings arranged in pairs, and inclined toward each other and with conical projections on opposite sides of the base and of relatively different lengths and serving to thoroughly mix and stir the gases as they pass by said device.

15. A torch comprising a head, a source of gas supply, and a nozzle having a cutting and a welding passage therethrough rotatable on said head.

16. A torch comprising a head, means for uniting oxygen and acetylene gas under pressure for a welding flame, a rotatable nozzle having independent passages for welding and cutting purposes, and means for supplying oxygen under a greater pressure to the cutting passage to produce a cutting flame.

17. A torch comprising a head, a nozzle rotatable on said head, means for supplying a mixture of oxygen and acetylene gas under pressure to the nozzle, and independent means for supplying oxygen gas to the nozzle under greater pressure to unite with the other gas for cutting purposes.

18. In a device of the character described, the combination with a head, of a nozzle detachably held thereto and adapted to be rotated thereon, said nozzle having independent cutting and welding passages therethrough, and a mixing device arranged between the head and the nozzle.

19. In a device of the character described, the combination with a head, of a cylindrical member arranged within the head and having a central passage and independent passages at the side of the central passage, independent sources of gas supply connected to said central passage, a third source of gas supply communicating with the outer passages, a nozzle having independent passage-ways therethrough communicating with the passages of the inner cylindrical member, one of said passages through the nozzle having its outer end arranged at an angle to direct the gas toward the mouth of the other passage.

20. In a device of the character described, the combination with a head having a welding passage, means for supplying oxygen and acetylene gases to said passage, said head having a cutting passage for oxygen gas independent of the other passage, a nozzle having independent welding and cutting passages of relatively different diameters communicating with the welding and cutting passages of the head, and means for supplying oxygen gas under greater pressure to the cutting passage.

21. In a device of the character described, the combination with a head, of a nozzle held to the head, and a carbon tip rotatably held on the end of the nozzle.

22. In a device of the character described, the combination with a head, of a nozzle held to the head, and a carbon tip held on the end of the nozzle.

23. In a device of the character described, the combination with a head, of a nozzle held to the head, and a carbon tip rotatably held on the end of the nozzle and provided with independent passages therethrough for the purpose set forth.

This specification signed and witnessed this 10th day of June A. D. 1909.

HARRY BROUSSEAU.

Witnesses:
W. A. TOWNER, Jr.,
M. DINNHAUPT.